United States Patent [19]
Kincaid

[11] Patent Number: 4,967,849
[45] Date of Patent: * Nov. 6, 1990

[54] GUARD ASSEMBLY FOR EARTH TILLERS

[76] Inventor: Charles L. Kincaid, 433 Bayview Blvd., Norfolk, Va. 23503

[ * ] Notice: The portion of the term of this patent subsequent to Feb. 6, 2005 has been disclaimed.

[21] Appl. No.: 802,056

[22] Filed: Nov. 25, 1985

[51] Int. Cl.$^5$ .................... A01B 33/02; A01B 33/12; A01B 71/08
[52] U.S. Cl. ........................................ 172/39; 172/42
[58] Field of Search .................. 172/42, 43, 72, 81, 172/112, 382, 513, 517, 626, 39, 106, 123

[56] References Cited

U.S. PATENT DOCUMENTS

| | | | |
|---|---|---|---|
| 479,779 | 8/1892 | Blankenship | 172/686 |
| 966,128 | 8/1910 | Satterlund | 172/106 |
| 2,070,155 | 2/1937 | Day, Jr. | 172/686 |
| 3,901,325 | 8/1975 | Richards | 172/81 |
| 3,985,185 | 10/1976 | Pierce | 172/81 |
| 3,985,186 | 10/1976 | Lee | 172/81 |

FOREIGN PATENT DOCUMENTS

| | | | |
|---|---|---|---|
| 547231 | 4/1932 | Fed. Rep. of Germany | 172/39 |
| 472207 | 9/1937 | United Kingdom | 172/382 |

*Primary Examiner*—Richard T. Stouffer
*Attorney, Agent, or Firm*—Robert W. Carlson

[57] ABSTRACT

The invention provides an apparatus which is adapted to be attached to conventional ground tillers such as the "Roto-Tiller" to prevent the build-up of grass and weeds around the drive shaft of the tines. The invention comprises a plurality of stationary blades mounted on the drive shaft gear box in a manner so as to cut grass and weeds before they become wound around the drive shaft.

2 Claims, 3 Drawing Sheets

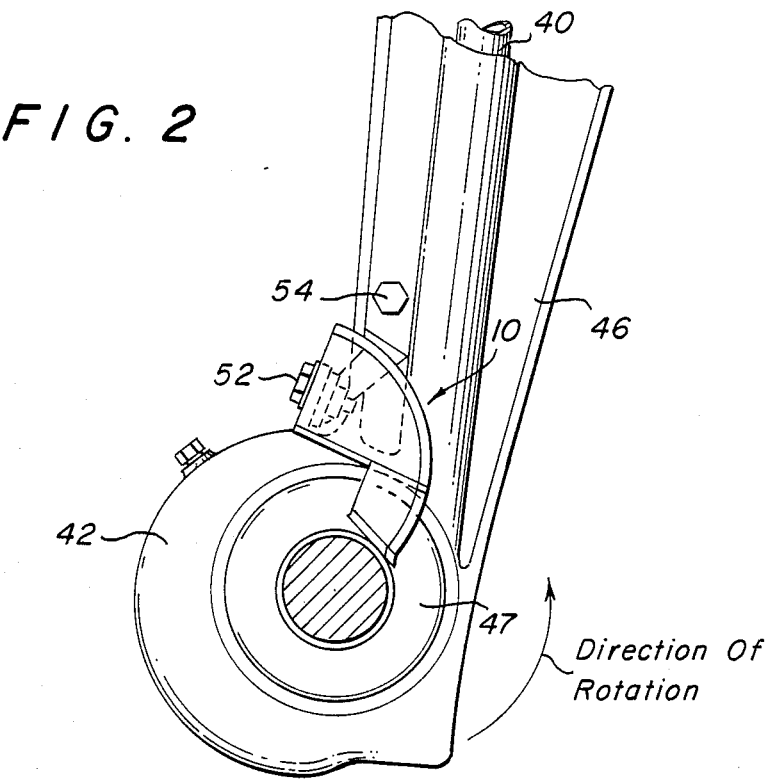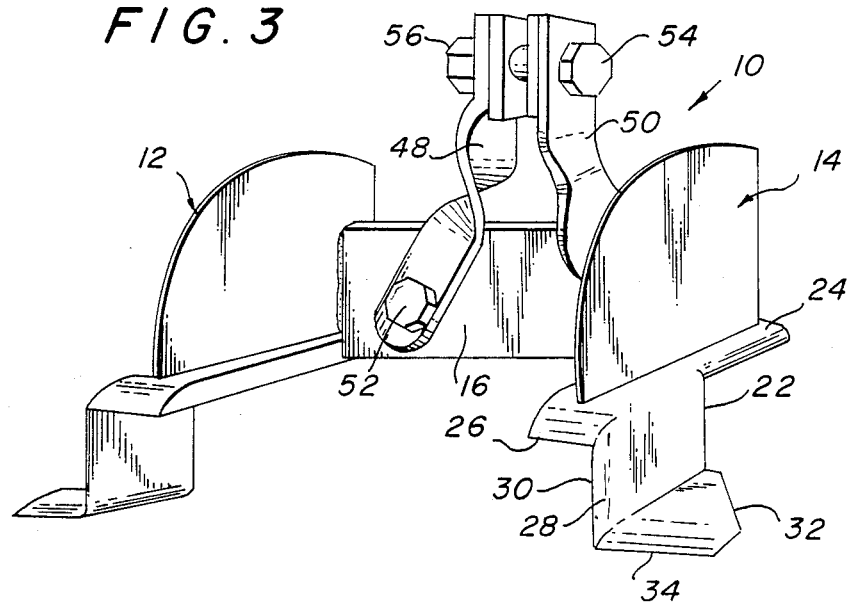

GUARD ASSEMBLY FOR EARTH TILLERS

BACKGROUND OF INVENTION

The use of small ground tillers which are manually guided and powered by internal combustion engines has grown considerably in recent years. It has been a real benefit to the home gardener. One problem that has been encountered in the use of such tillers, is the build-up of tall weeds and grass being wound around the drive shaft. The build-up of weeds and grass which usually contains a considerable amount of sand and dirt particles results in forcing the sand and dirt particles into the grease seals around the drive shaft and destroys the seals. The destruction of the seals results in loss of lubricant in the drive gear box, bearing failure, and the failure of the entire drive unit.

The present invention prevents the build-up of the weeds and grass around the drive shaft and overcomes the above mentioned problem.

Pierce U.S. Pat. No. 3,985,185 and Goertzen U.S. Pat. No. 4,402,365 provide devices to prevent the build-up of weeds and grass around the drive shafts of a tiller. It is believed that the subject invention is an improvement of the prior art.

THE DRAWINGS

FIG. 2 is a side view, partially in section of the guard mounted on the gearbox of a conventional tiller; and FIG. 3 is a perspective view of the guard.

THE INVENTION

Figure 1:
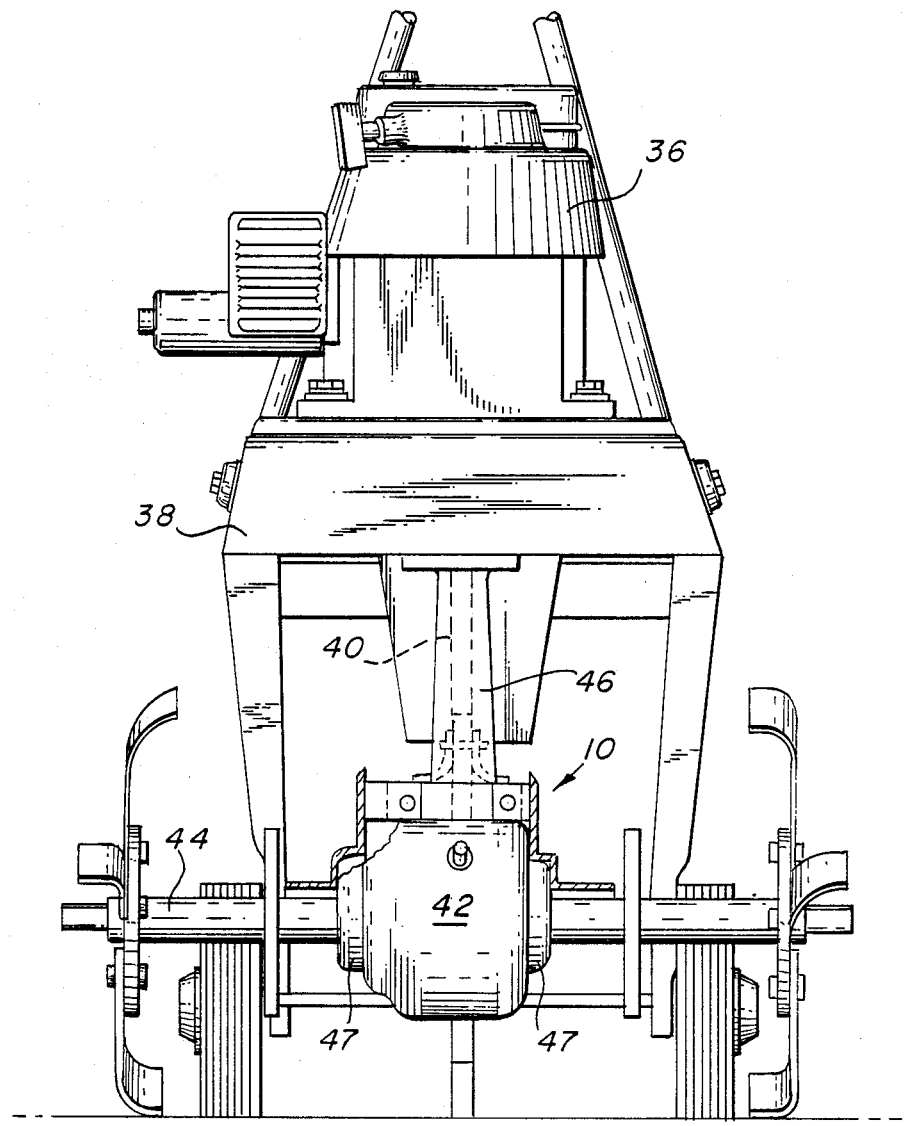
FIG. 1 is an elevational view of a conventional tiller with the guard attached thereto.

The guard 10 comprises a pair of cutting numbers 12 and 14, one being a mirror image of the other, which are secured to each end of a bar 16. The cutting members are secured to the bar 16 by welding or the like.

Each cutting member comprises a plurality of blades having cutting edges which, when the guard is mounted on the tiller, face the direction of movement of the tiller. Each cutting member has a first cutting blade 18 which is secured to the bar 16 and extends vertically therefrom. The blade 18 has a semi circular cutting edge 20.

A second blade 22 is formed in a somewhat Z-shape when viewed from the front. The blade 22 has a horizontal portion 24 which is rigidly secured to the bottom edge of the blade 18 and is provided with a cutting edge 26. A vertical portion 28 extends downwardly from the portion 24 and is provided with a cutting edge 30. The blade 22 has a further horizontal portion 32 extending from the bottom of the vertical portion 28. The portion 32 is provided with a cutting edge 34. Means are provided for readily attaching the guard assembly to a conventional tiller. The conventional tiller construction is illustrated in FIG. 1. The engine 36 is mounted on a support 38. A vertical drive 40 extends downwardly to a gear box 42 which is supported by the tine drive shaft 44. A housing 46 encloses the drive shaft 40 to prevent dust and weeds from fouling the drive shaft. A pair of dust covers 47 prevent debris from entering the gear box 42.

The guard assembly is clamped to the housing 46. The clamping means comprises a pair of straps 48 and 50 secured to the bar 16 by means of bolts 52. Each strap is given a 90 degree twist so that the free ends of the straps are parallel. A bolt 54 extends through a hole in the ends of the straps 48 and 50 and a nut 56 is provided to draw the free ends of the straps together.

When the guard assembly is to be mounted on a tiller, a hole is drilled through the housing 46. The free ends of the straps 48 and 50 are positioned on each side of the housing 46 adjacent the hole in the housing.

The bolt 54 is then inserted through the holes in the free ends of the straps 48 and 50 and the hole in the housing 46. The nut 56 is then tightened to firmly clamp the guard assembly to the housing 46.

As best shown in FIG. 1 the guard assembly provides cutting edges adjacent each side of the gear box and adjacent the portions of the drive shaft extending from the gear box.

What is claimed:

1. In combination with a rotary garden tiller having a frame, rotary tiller blades attached to a horizontally extending drive shaft positioned in a housing mounted on said frame and having an engine for driving said drive shaft, a guard assembly attached to said housing by attachment means for preventing buildup of grass and weeds on said drive shaft, said guard assembly comprising a first cutting member and a second cutting member, each of said cutting members being rigidly secured to opposite ends of a bar, each of said cutting members having a plurality of blades, a first one of said blades of each of said cutting members secured to said bar and extending vertically relative thereto, a second one of said blades of each of said cutting members having a horizontal portion rigidly secured to its respective one of said first cutting member blades, each said second one of said cutting member blades having a vertical portion extending downwardly from said horizontal portion, each said second one of said cutting member blades having a further horizontal portion extending laterally from said vertical portion, said further horizontal portion being positioned closely adjacent to said shaft so that said cutting members prevent build-up of grass and weeds on said drive shaft.

2. A guard assembly as set forth in claim 1 wherein the attachment means comprises clamp means removably secured to said housing so that said cutting members are supported in spaced relation from each side of said housing.

* * * * *